UNITED STATES PATENT OFFICE.

WILLIAM MORRISON, OF DES MOINES, IOWA.

ALKALINE BATTERY CONTAINING CHROMIUM AND MERCURY.

975,885.
Specification of Letters Patent. Patented Nov. 15, 1910.
No Drawing. Application filed November 22, 1909. Serial No. 529,187.

*To all whom it may concern:*

Be it known that I, WILLIAM MORRISON, a citizen of the United States of America, and resident of Des Moines, Iowa, have invented a certain new and useful Improvement in Alkaline Batteries Containing Chromium and Mercury, of which the following is a specification.

My invention relates to improvements in reversible galvanic batteries in which zinc is one of the elements, and has for its object the production of a battery in which mercury is present in the anode, or negative-pole electrode, and one in which the zinc will not dissolve in the electrolyte in the discharge of the battery.

A further object is the production of a battery of moderate cost that will hold its charge over a long time and will also have a long period of efficiency.

These and such other objects as may hereinafter appear are attained by my invention.

I find that a battery in which the negative-pole electrode contains a zinc-chromium compound together with a sufficient amount of mercury, gives excellent results and will hold its charge over a much longer period of time than the batteries now in use.

In the formation of the battery, I use an alkaline electrolyte and any suitable positive support within or on which I place the active material or material-to-become-active. I find in this type of battery that a mixture of a zinc-chromium compound with oxid of mercury is extremely well suited for an active material.

I find in the working of the battery that zinc is substantially insoluble in the solution in the presence of the chromium compound, even though the zinc be greatly in excess of the amount which would combine with the chromium to form a definite chromite. It is the action of the chromic oxid that prevents the zinc from dissolving in the solution on the discharge, and the presence of the mercury makes it possible for the battery to hold its charge over a long period of time.

I find that good results may be obtained in the following manner, to which, however, I am not limited: Sulfates of zinc and chromium are dissolved in water, and sufficient potassium hydrate is added to precipitate a zinc-chromium-oxygen compound. The compound formed may not be zinc chromite but does contain associated oxids of zinc and chromium, the zinc oxid preferably being in excess of the amount corresponding to a chromite. This precipitate is then thoroughly washed, preferably in hot water to which a little alkali has been added. I then dissolve mercury in nitric acid and add an alkaline solution, whereby an oxid of mercury is precipitated. This precipitate is also thoroughly washed, preferably in hot water. The two precipitates are then thoroughly mixed, and the resulting mixture is applied to the support or grid. In applying the material, I preferably use considerable pressure in order to firmly fix the material in place. I also preferably place a porous covering over the active material to avoid any chance of its falling away from the support.

I find that the chromium compound, even in small amount, entirely insufficient to convert the zinc into a chromite, has the specific property of substantially preventing the zinc from dissolving in the solution, causing the zinc oxid or hydroxid to assume a flocculent condition in which it will not pass through the porous covering surrounding the active mass.

While not necessary, I prefer to use an electrolyte comprising a potassium hydrate solution containing a small amount of chromium, for instance, chromate of potassium, although a workable battery is produced by using simply a solution of hydrate of potassium or sodium.

I claim:—

1. In a reversible alkaline battery, an anode, or negative-pole electrode, containing an oxidizable metal and a chromium compound.

2. In a reversible alkaline battery, an anode, or negative-pole electrode, containing an oxidizable metal, a chromium compound and mercury.

3. In a reversible alkaline battery, an anode, or negative-pole electrode, containing an oxidizable metal and a chromium-oxygen compound.

4. In a reversible alkaline battery, an anode, or negative-pole electrode, containing an oxidizable metal, a chromium-oxygen compound and mercury.

5. In a reversible alkaline battery, an anode, or negative-pole electrode, containing zinc and a chromium-oxygen compound.

6. In a reversible alkaline battery, an anode, or negative-pole electrode, containing zinc, a chromium-oxygen compound and mercury.

Signed by me at Chicago, Illinois, this 19th day of November, 1909.

WILLIAM MORRISON.

Witnesses:
WM. B. DURNION,
ELLEN H. CLEGG.